Patented Jan. 9, 1923.

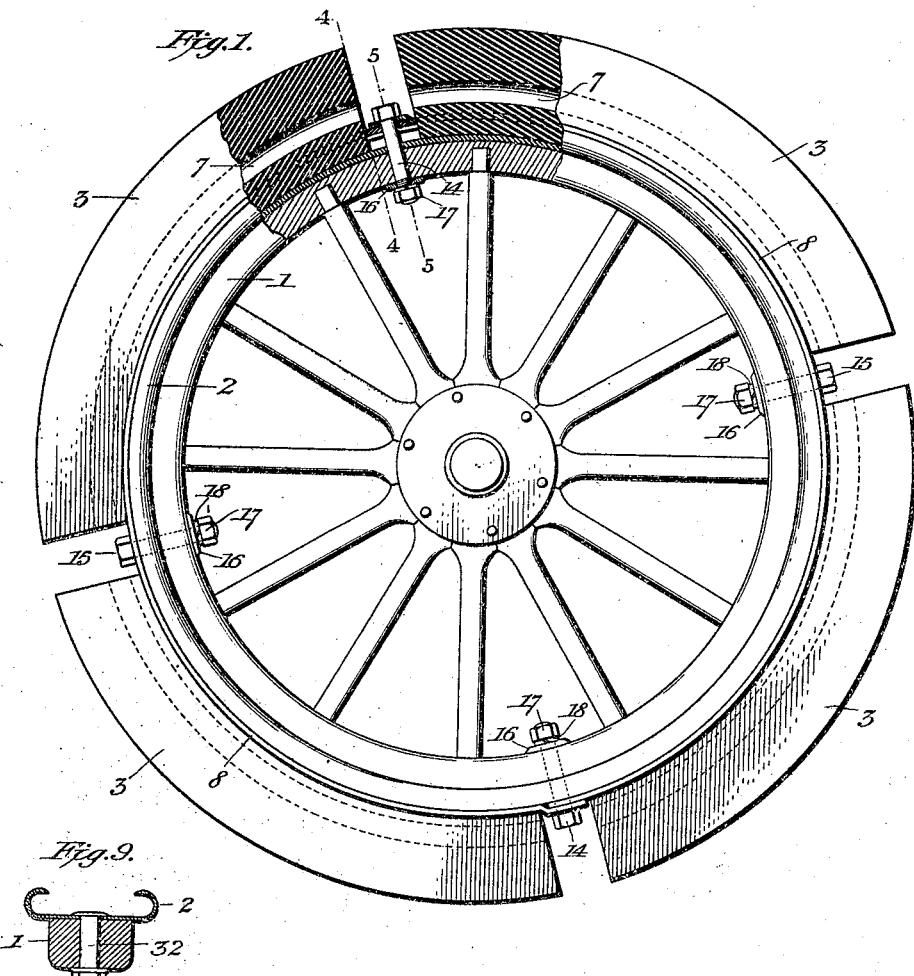
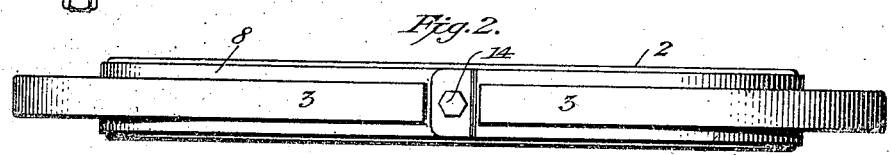
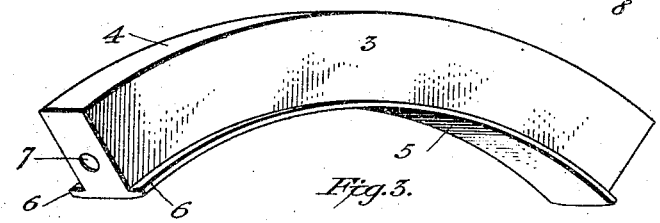

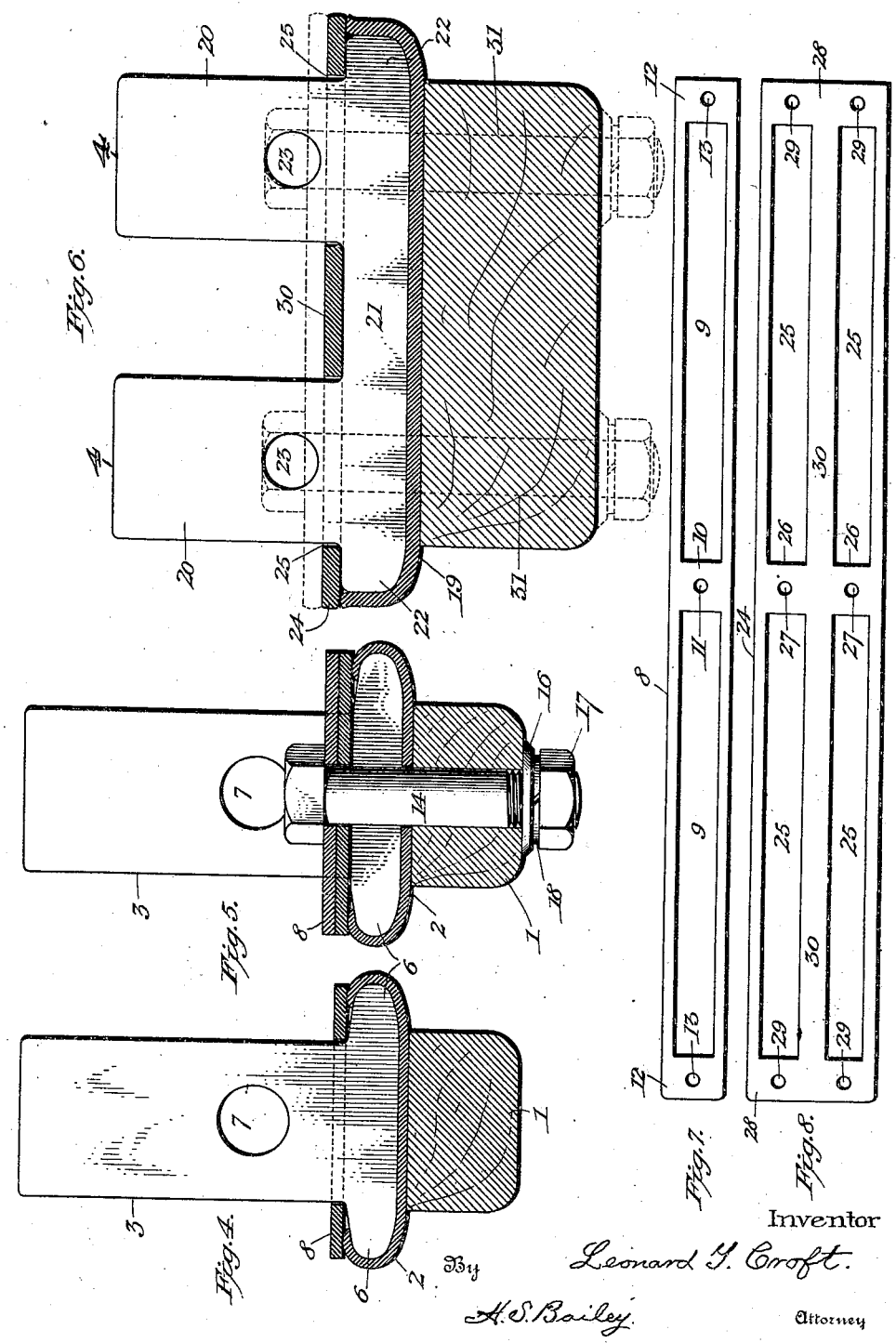

1,441,403

UNITED STATES PATENT OFFICE.

LEONARD Y. CROFT, OF DENVER, COLORADO, ASSIGNOR OF ONE-EIGHTH TO MINNIE L. KING, OF CLIFF, COLORADO.

SECTIONAL RESILIENT AUTOMOBILE TIRE AND MEANS FOR SECURING THE SAME.

Application filed March 25, 1922. Serial No. 546,619.

*To all whom it may concern:*

Be it known that I, LEONARD Y. CROFT, a citizen of the United States of America, residing at the city and county of Denver and State of Colorado, have invented new and useful Sectional Resilient Automobile Tires and Means for Securing the Same, of which the following is a specification.

My invention relates to improvements in sectional resilient automobile tires, and securing means for the same.

The object of the invention is to provide a non-pneumatic resilient tire which is made up of a plurality of segmental sections, and improved means for securing the tire sections upon any form of pneumatic tire rim in common use, and in such manner as to permit of the removal of a damaged section, and its replacement with a new section, the invention contemplating the employment of the same wheel with either a pneumatic tire or with the improved sectional resilient tire, thus adapting the car for either truck use or for pleasure riding.

Further to provide a tire made up of sections which are constructed with a single tread member for light load use, or with twin tread sections for heavy load use; the sections being adapted for either clincher rims or straight side rims; slotted clamping strips being placed over the sections and bolted to the wheel in such manner as to securely hold the sections in place upon the rim.

These objects are accomplished by the character of tire illustrated in the accompanying drawings in which:

Figure 1 is a side view partly in section of a wheel provided with a tire constructed in accordance with my invention.

Fig. 2 is an edge view of the wheel shown in Fig. 1.

Fig. 3 is a perspective view of one of the tire sections.

Fig. 4 is an enlarged sectional view on the line 4—4 of Fig. 1.

Fig. 5 is a similar view on the line 5—5 of Fig. 1.

Fig. 6 is a sectional view similar to Fig. 4 but showing a tire section having twin tread members.

Fig. 7 is a plan view of one of the clamping strips for securing the tire sections having the single tread member.

Fig. 8 is a plan view of one of the clamping strips for securing the tire sections having the double or twin tread members, and Fig. 9 is a transverse sectional view through an ordinary felly and rim, showing the manner of closing three of the bolt holes therein, when the sectional tire is removed and a pneumatic tire is used.

Referring to the accompanying drawings: The numeral 1 designates the felly of an automobile wheel, and 2 the rim, these parts being of a type in general use.

The improved tire is made up of a plurality of segmental rubber sections 3, preferably four in number, which may vary in thickness and also in height from rim face to tread face, relatively to the rim upon which they are to be secured; the narrow rim, contemplating a light load tire, and the wider rim, a relatively heavy load tire. Each tire section is formed with flat sides and with a flat tread face, 4, the rim face, 5, being formed with laterally projecting beads 6, which are adapted for attachment to either the common form of clincher rim, or to a straight side rim, as may be required, these beads corresponding to those which are formed on the casing of the usual pneumatic tire.

In the manufacture of the improved tire sections those intended for the lighter classes of cars and therefore lighter loads, are given a relatively greater resiliency than those intended for heavier cars adapted for heavier loads, and the resiliency of each section is augmented by a hole or passage, 7, which extends through the same from end to end, concentric with the arc of the section, and preferably nearer its rim face than its tread face. Each section is of less length than a quadrant of the rim in which it is to be placed, so that when the four sections are placed in position on the rim, the adjoining ends of each two sections are separated by a space of approximately two inches, thus forming four equidistant gaps in the tread face of the tire, as shown in Fig. 1.

After the sections have been placed around the rim by springing their beads, 6, into the curled edges of the said rim, if the same is a clincher rim, they are held securely in place by two semi-circular clamping strips 8, each of which is formed with two longitudinal slots 9, which permit the strip to be placed over two of the sections, and lie flat against the rim, the sections projecting through the slots 9 as will be understood. The inner ends of the slots 9 of each semicircular strip are separated by a web 10, the length of which defines the space between the opposing ends of two tire sections, and each web has a central bolt hole 11. The distance between the outer end of each slot 9, and the adjacent end of the strip is also equal to the space between the opposing ends of two tire sections, and when the two strips are placed over the tire sections the end portions 12, of one strip overlap those of the other strip, and these portions are provided with registering bolt holes 13.

Bolts 14 are passed through the holes 13 and through registering holes in the rim and felly, and bolts 15 are passed through the holes 11 and through registering holes in the rim and felly.

Washers 16 are then placed upon each bolt so as to rest against the felly and nuts 17 are screwed upon the bolts, and either directly against the washers 16, or if desired, split lock washers 18 of a common type may be placed upon the bolts between the washers 16 and the nuts 17, so that when the nuts 17 are screwed tightly against the said lock washers, the said nuts will be held against backward turning on the bolts. Any other locking means, however, may be used in connection with the nuts 17.

The semicircular clamping strips 8, when bolted in place, fit tightly around the wheel rim and also around the beads 6 of the tire sections, as clearly shown, and as these strips are of a thickness to insure the requisite rigidity under all strains to which the tire sections may be subjected, they will hold the said sections securely upon the rim, and the sections will be held against endwise movement, by the central webs 10 of the strips and also by the outer marginal ends of the slots 9.

From the above description taken in connection with the drawings, it will be seen that the same wheels can be used either with pneumatic tires, or with my improved sectional resilient tires, or the latter tires could be placed upon the rear wheels only, if desired, the only change required in the present form of wheel to adapt it to the improved sectional tire, being the forming of three additional holes through the rim and felly of the wheel, to accommodate the clamping bolts 14 and 15, the usual air valve hole serving to accommodate one of the bolts.

One end portion 12 of each clamping strip 8 is slightly offset, as shown, thereby to permit all of the strip excepting the overlapping end portion, to contact with and rest upon the wheel rim.

In Fig. 6 of the drawings, I have shown a tire adapted particularly for trucks or for cars intended for carrying heavy loads.

In this arrangement, I show a straight sided rim, and one which is much wider than the rim shown in Figures 4 and 5. The tire sections used in this connection comprise double or twin spaced tread members 20, which are connected by an integral base or web 21, the base portion of the members 20 being formed with laterally projecting beads 22. In this form of tire the tread members 20 are preferably of less height from rim face to tread face, than are the tread members of the sections shown in Figures 4 and 5, this decrease in height giving greater rigidity to the members 20, and therefore enabling them to withstand a greater pressure in proportion to their thickness, than would otherwise be the case. Moreover, the rubber in the twin tread section is preferably of a less resilient character than that of which the lighter tires are made, and the holes or passages 23 which extend through the tire are preferably of less diameter than the corresponding holes in the lighter tires. These tire sections are held in the rim by semicircular clamp strips 24, which are provided with two pairs of longitudinal slots 25, the solid portions or webs 26 which separate each two end to end slots, being provided with bolt holes 27, while the end portions 28 are each provided with two bolt holes 29. The strips are placed over the tire sections, the twin tread members of which extend through the slots 25, so that the portions 30 of the strip which separate each two parallel slots, rest upon the base webs 21 of the two sections, while the side edge portions of the strip rest upon the beads 22 of the tire and thus securely clamp the tire sections to the rim, as clearly shown in Fig. 6. The ends of the strips 24 are adapted to overlap in the same manner as the ends of the strips 8, and the strips 24 are secured to the rim 19 by bolts 31, eight of which are employed, or twice the number used in connection with the strip 8. The thickness of the clamp strips 24 is proportionate to the size of the tire sections so as to insure the required strength and rigidity and hold the tire sections securely in place upon the rim.

The invention thus provides a simple and effective form of cushion tire which is applicable to all rims in common use, making possible the interchangeable feature, or the use of either pneumatic tire or the improved cushion tires on the same wheel rims, and the simplicity of the clamping means enables the cushion tire to be easily and quickly installed. Mud or stones caught between the opposing ends of the tire sections, will be ejected by the centrifugal force of the wheel, thus preventing these spaces from becoming clogged.

When the improved cushion tires are removed for the purpose of attaching pneumatic tires, the holes through the rim and felly, other than the one through which the air valve extends may be closed by a flat headed bolt 32, as shown in Fig. 9.

Having described my invention, what I claim as new and desire to secure by Letters Patent, is:

1. In a device of the character described, the combination with a wheel rim having annular side walls, of a cushion tire made up of four sections having lateral beads for engagement by said side walls, slotted semicircular clamps which are placed over said sections and rest upon said side walls, said clamps having overlapping ends, and bolts which extend through said overlapping ends, and through intermediate portions of the clamps, and through the rim and felly of the wheel.

2. In a device of the character described, the combination with a wheel rim having annular side walls, of a cushion tire on said rim made up of four spaced sections having lateral beads, slotted semicircular clamps which are placed over said sections and rest upon the side walls, the ends of one clamp overlapping those of the other, each pair of the said overlapping ends lying between the opposing ends of two of the tire sections, bolts extending through the said overlapping ends and through the rim and felly, bolts extending through intermediate portions of said clamps and through the rim and felly, each of the latter bolts lying between the opposing ends of two tire sections and clamp nuts on all of said bolts.

3. The combination with a wheel rim, of a plurality of tire sections mounted thereon, each comprising two spaced parallel integally connected tread portions, and laterally projecting beads along the rim face of said tread portions, clamp strips for said sections having pairs of parallel slots through which said parallel tread portions project, said strips engaging said beads and the connecting portions of said sections between said tread portions, and resting along their side edge portion upon said rim, and bolts which extend through said clamp strips and through the rim and felly, for securing said strips upon said rim, thereby securing said tire sections to said rim.

In testimony whereof I affix my signature in presence of two witnesses.

LEONARD Y. CROFT.

Witnesses:
G. SARGENT ELLIOTT,
ELIZABETH SMITH.